United States Patent
Gross et al.

(10) Patent No.: US 8,155,437 B2
(45) Date of Patent: Apr. 10, 2012

(54) PERCEPTUALLY LOSSLESS COLOR COMPRESSION

(75) Inventors: Ari David Gross, West Hempstead, NY (US); Raphael Meyers, Long Beach, NY (US); Navdeep Tinna, Mississauga (CA)

(73) Assignee: CVISION Technologies, Inc., Forest Hills, NY (US)

( * ) Notice: Subject to any disclaimer, the term of this patent is extended or adjusted under 35 U.S.C. 154(b) by 728 days.

(21) Appl. No.: 12/206,707

(22) Filed: Sep. 8, 2008

(65) Prior Publication Data

US 2009/0067709 A1    Mar. 12, 2009

Related U.S. Application Data

(60) Provisional application No. 60/967,815, filed on Sep. 7, 2007.

(51) Int. Cl.
*G06K 9/00* (2006.01)
*G06K 9/36* (2006.01)
*G06K 9/46* (2006.01)

(52) U.S. Cl. ........................................ 382/166; 382/244

(58) Field of Classification Search .................. 382/128, 382/164, 166, 172, 173, 181, 199, 209, 244; 345/501, 581, 611; 348/143, 154, 165; 375/240.08; 358/464; 600/407, 439
See application file for complete search history.

(56) References Cited

U.S. PATENT DOCUMENTS

| | | | |
|---|---|---|---|
| 7,203,360 B2 * | 4/2007 | Lee et al. | 382/173 |
| 7,212,670 B1 * | 5/2007 | Rousselle | 382/173 |
| 7,245,315 B2 * | 7/2007 | Sadok et al. | 348/165 |
| 7,280,696 B2 * | 10/2007 | Zakrzewski et al. | 382/218 |
| 7,324,120 B2 * | 1/2008 | Curry et al. | 345/611 |
| 7,630,548 B2 * | 12/2009 | Grady | 382/173 |
| 7,693,563 B2 * | 4/2010 | Suresh et al. | 600/407 |
| 7,715,627 B2 * | 5/2010 | Sun et al. | 382/173 |
| 2004/0032906 A1 * | 2/2004 | Lillig | 375/240.08 |
| 2009/0067709 A1 * | 3/2009 | Gross et al. | 382/166 |
| 2010/0034444 A1 * | 2/2010 | Emhoff et al. | 382/129 |

* cited by examiner

*Primary Examiner* — Amir Alavi
(74) *Attorney, Agent, or Firm* — Kenyon & Kenyon LLP

(57) ABSTRACT

A system and method of color data compression may perform variations of MRC compression including taking into consideration means and/or variances within k×k cells of an image, background texture, background smoothed color, and gradient components for determination of which parts of an image belong to the background and foreground MRC layers, for calculating thresholds values for such determinations, and determining correctness of determined thresholds and polarity, and may determine the background and foreground layer colors based on the variances, the gradient components, and neighboring pixels of non-color-assigned pixels of the background and foreground layers.

38 Claims, 2 Drawing Sheets

PERCEPTUALLY LOSSLESS COLOR COMPRESSION

CROSS-REFERENCE TO RELATED APPLICATIONS

This application claims priority to U.S. Provisional Patent Application No. 60/967,815, filed Sep. 7, 2007, which is herein incorporated by reference in its entirety.

FIELD OF THE INVENTION

The present invention relates to a system and method for performing perceptually lossless color compression, and, in particular, to such compression using variations of Mixed Raster Content (MRC) compression.

BACKGROUND INFORMATION

Perceptually Lossless Color Compression is desirable in the field of digital imaging, in particular, with application to improved performance of network and mobile imaging devices. Conventional systems provide either lossy or lossless compression, neither of these modes being adequate for most digital imaging or remote capture applications. Lossless compression in colorspace generates very large file sizes, unsuitable for distributed databases and other applications where transmission or hosting size is a factor. Lossy compression assumes an implicit tradeoff between bitrate and distortion so that the higher the compression, the greater the level of distortion. One example conventional compression method is MRC compression. (See Mixed Raster Content (MRC) Model for Compound Image Compression, Ricardo de Queiroz et al., Corporate Research & Technology, Xerox Corp., available at http://image.unb.br/queiroz/papers/ei99mrc.pdf, and see U.S. Pat. No. 7,110,137, the entire disclosures of which are incorporated herein by reference.) In MRC coding, there is typically a foreground layer, a background layer, and a mask (or selector layer) which has a binary value that determines whether a pixel in the image is given the color value of the foreground or background layer. With respect to business documents, the mask layer is an important layer, which generally contains the text and line art information. Since the mask layer is so important, it is generally encoded with the same resolution as the original image, even though this may have a high byte cost. In fact, for very low resolution images, the mask layer may even be of a higher resolution than the original image. The foreground layer assigns a color to those pixels that the mask places in the foreground, while the background layer assigns a color value to the remaining pixels. Both the foreground and background layers are generally encoded at a lower resolution than the original image.

However, what is desired, in fact, neither of these methods achieves: a very high compression rate with no perceptual distortion. Many applications and devices, including digital copiers and MFPs, need a high degree of compression on color scanned documents. For documents to be used effectively as e-mail attachments or in a web-hosted environment, lossless compression is not viable. Even for sensitive medical applications, including CAT and MRI scans, lossless compression is not used in the industry. However, for many applications, including corporate document record archiving, no perceptual loss can be tolerated as these image documents are often treated as the documents of record.

SUMMARY

Embodiments of the present invention provide systems and methods that achieve very high rates of compression on color scanned documents with minimized loss, e.g., no perceptual loss. These systems and methods generally do not accept the standard compression rule that there is always an implicit rate/distortion tradeoff. Rather, the perceptually lossless compression of the present invention may be computer vision-based such that compression is achieved by inverting the series of graphics and/or printing steps that were used initially in image generation. As such, the systems and methods of the present invention may understand as fully as possible whether a given image satisfies a certain set of constraints before trying to "deconstruct" and compress the image.

In an example embodiment of the present invention, a system and method may be provided that is segmentation-based and falls under the category of the general MRC coding compression method. This method may rely on accurate segmentation of an image into its constituent parts, optionally enhancing certain components, and then using layer-based separation and region-specific coding methods. Dividing the document into distinct layers offers advantages for both image quality and compression, as each layer can be given a different level of quality setting and resolution reduction. It also assists in efficient OCR of the image, as the mask layer may be presented directly to an OCR engine. For the most accurate results, both the mask layer and either the original or a processed color image may be shown to an OCR engine, with the results combined in a such a manner that when they differ, the values presumed to be more accurate are chosen.

In an example embodiment of the present invention, computer-vision based methods of image understanding may be provided. Pixels may be converted into objects, and these objects may then be used to form a hierarchical image decomposition, where this decomposition is then used in the compression process. This conversion of the image into salient objects, in a hierarchical structure, including connected components, words, lines, text and picture regions, etc., is akin to human visual image processing. A properly segmented image, in line with human segmentation, can achieve much better compression rates, with no perceptual loss, as compared to non-Boolean JPEG (DCT) and wavelet based methods.

DETAILED DESCRIPTION

Preprocessing

Figure 1:
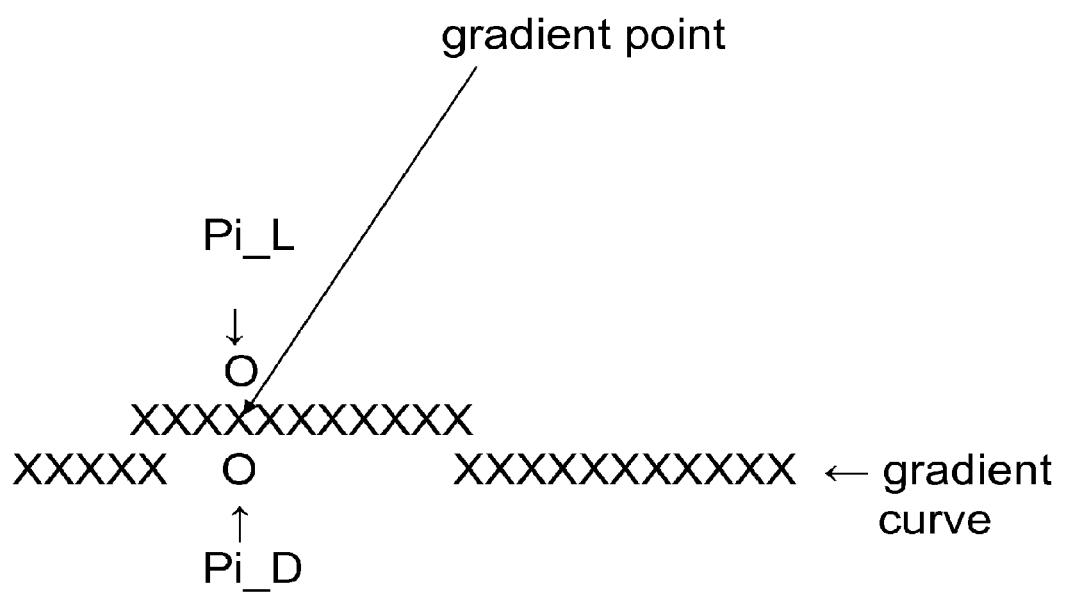
FIG. 1 shows selection of a dark and a light pixel value along a parallel direction to a gradient direction for insertion of the values into arrays in a threshold value determination method, according to an example embodiment of the present invention.

Method to Find Halftone Screens and Texture Before Smoothing

A constant color of an original input object may be provided using a screening pattern, where the actual included color is a combination of a few colors in a pattern that at a distance looks like the original color. Since the color is provided using a color combination, the single color is susceptible to incorrect interpretation by a processor as a structure to be represented in a mask layer of MRC coding for inclusion as a foreground object. In an example embodiment of the present invention, the system and method may determine that the screen is not to be interpreted as a structure. In this case, the system and method may smooth the pixels of the background. The screening structure may accordingly be softened.

Initially, the system and method may find halftone and texture portions and determine that these belong to the background. The system and method may accordingly selectively smooth only these portions and not, for example, text. On the other hand, when conventional systems smooth an image, the entire image as a whole, regardless of whether it includes text or not.

To find the regions that need smoothing, the system may look at the variance in a section of k×k cells. Grayscale variance may first be obtained for each such section. Then the section may be smoothed. Subsequently, the variance may be re-calculated. The system and method may then compare the two variances to obtain a ratio. If the ratio is more than, e.g., 5; or, if the ratio is less than 5 and at least, e.g., 2, and the recomputed variance is less than some threshold number, in either case, the system and method may perform the smoothing in a more permanent manner.

Accordingly, the system and method may divide the color image into cells of k×k pixels, where a typical value for k is 16, compute the variance of each k×k cell, smooth the k×k cell using an integer-based uniform smoothing function, and re-compute the variance. It may be assumed that the k×k cell is a screened halftone color region when any one of the following conditions is satisfied:

i. if the ratio of original variance to the recomputed variance after smoothing exceeds some ratio r1, e.g., 5; and ii. the ratio exceeds some lesser ratio r2, e.g., 2, and the recomputed variance is less than some value v, e.g., 30.

Alternatively, instead of using variance, the system and method may compute the gradient image and eliminate all non-maximal gradient points for this image G, such that the edge map—where pixels are "on" only where there is an edge—is computed for this image. The system and method may then analyze each k×k block, where k is, e.g., 16 or 32, in G to determine the number of gradient points Ng—points at which a change occurs, represented by a black pixel in the gradient image, the number of gradient endpoints Ne—a gradient point having only one other gradient point in its surrounding eight neighbors, and the number of singleton gradient point Ns—a gradient point having no turned on neighbor in its 8 basic directions (north, south, east, and west). Based on these determinations, the system and method may determine whether the considered region should be classified as a screened halftone. For example, where k=32, values for determining that smoothing should be performed may be Ng>400 and Ne>35 and Ns>20, in which case the cell may be classified as screened halftone.

Method to Smooth Halftone Screens and Texture without Distortion of Text Regions The regions determined by the system and method to be candidates for smoothing might still include some text.

Accordingly, for every k×k cell where a halftone screen was detected as described above, the system and method may perform the smoothing in the following manner. An initial smoothing, which may be an integer-based approximation of a Gaussian, may be applied to the cells. One typical smoothing implementation is where all eight neighbors are equally weighted, with their combined weight equal to the weight of the center pixel.

Next, the system and method may determine the background, descreened color—the single color that represents the screening pattern of the various colors. The descreened color may be determined as follows: for each non-overlapping 2×2 sub-cell of the original image, determine the variance, sort the sub-cells by increasing variance, select all 2×2 sub-cells whose variance is in the lowest quartile, and compute the median color value of the selected sub-cells. The median color value may be used as the approximate background color value.

To preserve the text in the k×k block, if any, the system and method may then re-visit each 2×2 sub-cell and apply a uniform smoothing only if the color mean of the sub-cell is within some distance Dc, e.g., 20, of the median color of the k×k cell.

Method to Smooth Halftone Screen and Textured Regions, But not Text, as a Function of Texture/Halftone Strength Where the smoothing is to be applied, the degree of smoothing, both for screened halftone texture regions and for general texture regions, can be calibrated to fit the strength of the texture. The strength of the texture may determine the weights of the Gaussian function of radius one (neighborhood of one pixel away) that is to be used for smoothing. For very strong texture of a 2×2 to which the pixel belongs (e.g., where there is a high variance), the smoothing function may approximate a uniform blur—a pure average (a strong smoothing); for very weak texture, the center pixel may be more heavily weighted.

Strength of texture can be determined by degree of variance.

Segmentation

Solving for Background Surfaces

Page Analysis of Constant Regions

Frequently a page will have a relatively flat background, which can make it easier for the system and method to segment the page into its respective foreground, background and mask layers. Every pixel on the page is converted to a grayscale value and placed into a histogram from 0 to 255. The maximum peak of the histogram is then identified. If more than a certain percentage (commonly 40%, 50% or 60%) of the grayscale values are within a range (usually 10 or 15) of the peak, the system and method looks for constant regions, as described below.

Method to Detect Constant Regions

In an example embodiment of the present invention, the system and method may find where there are constant regions in the input image. This may allow for reducing the size of image and for the printing to be performed by the printer in a very quick manner.

A quadtree may be used for region labeling. In other words, the system and method may first analyze the highest node, e.g., including 32×32 pixels. If the values are constant in the node, then the system and method may move on. If not constant, then the system and method may examine the level below for constant color, and so on.

Where there is a large region of approximately constant color, then the system and method may classify those regions as having constant color. But some of the lower 2×2s may also be determined as belonging to the large region that has the constant color.

Accordingly, to determine the flat regions in the image—the regions having constant color, a quadtree approach may be used, with the top level of the quadtree consisting of the smallest square necessary to contain the entire image. With all quadtrees, the dimensions of the squares are of form k×k, where k is equal to $2^n$ for some integer n. Starting from this top level of the quadtree, the system and method may recursively subdivide the quadtree (into children) until squares of size 2×2 are reached. Each of these 2×2 blocks is given a unique index. For each 2×2, the system and method may label it a "constant region block" if the variance of the block is below a threshold T. e.g., 70. The system and method may compute the mean of each of the constant region 2×2 blocks and add these newly determined constant regions to the constant region list of 2×2 blocks. (At this point, the list for each 2×2 will consist only of itself.) The system and method may then go up each level of the quadtree. At each level, the parent looks at the lists of its four children, and attempts to combine them into as few lists as possible. To do this, the system and method may iterate through the array of regions and compare them two at a time. If two regions have a mean that is within a certain tolerance Tcm, and if the variance of the union of the two regions is below a threshold Tcv, the system and method may combine the two lists.

When the top level of the quadtree is reached, the system and method may sort all available constant region lists by their size. All the constant regions with a size less than threshold Tcr may be eliminated. All remaining constant regions can be used for segmentation purposes.

Alternatively, constant region detection can be accomplished using overlapped pyramids.

Method to Threshold Components Using Assuming Flat Background

Once the constant color region is found, the system and method may allocate to the background layer all pixels that are within a tolerance of the constant color. Remaining pixels may be allocated to the foreground layer. The system and method may calculate the foreground color as the average of the remaining pixels allocated to the foreground layer. However, this method may result in false positives with respect to the foreground layer.

Having computed a flat background region, i.e., a constant color background region, and determined the remaining connected components of the intensity or color image (intensity image is a grayscale of the original image), the system and method may then extract the smaller textual components as discussed below in the section entitled "Solving for foreground text."

But this may still be imprecise since there can be some background pixels attached to the foreground.

Accordingly, the system and method may compute the average intensity value for all the text components, e.g., the smaller textual components discussed below in the section entitled "Solving for foreground text." This intensity may be approximated as the foreground text intensity. Subsequently, the system and method may revisit each of the text components discussed below in the section entitled "Solving for foreground text." For each such component, the system and method may visit all the pixels in the component's bitmap comparing the pixels' intensities with the background intensity and the approximate foreground intensity. For each pixel, if the intensity is closer to the background intensity the system and method may re-label the pixel as background and, otherwise, maintain its label as foreground.

In one implementation, this can be applied iteratively until convergence, i.e., until re-labeling is no longer performed. That is, the system and method may, in each iteration, compute another average of the text and, for each pixel, re-determine whether the pixel's value is closer to the background or to the text color. This may be done until the values of all remaining pixels are closer to the text.

Method to Detect Constant Halftone and Texture Blocks

In an example embodiment of the present invention, the methods described in this section and in the section entitled "Method to detect constant halftone and texture regions" may be used instead of that described in the section above entitled "Method to detect constant regions" where the constant regions include a high variance.

In an example embodiment of the present invention, the system and method may determine whether a block is a texture block.

The system and method may divide the image into k×k regions, where k is, e.g., 32. Those regions by the boundary may have their regions filled with padded pixels. The k×k regions may be subdivided into j×j sub-blocks, where j is, e.g., 4. For each j×j sub-block, the system and method may compute its mean and variance. For each k×k block, the system and method may compute the difference, Dm, between the maximum mean and the minimum mean of its j×j sub-blocks. The system and method may also compute the ratio, Rv, of the maximum variance to the minimum variance of its j×j sub-blocks. For each k×k block, if Dm is less than the threshold value Tm and Rv is less than the threshold value Tv, the system and method may consider this block to be a texture block.

While this method can be used independently of the method mentioned in the section above entitled "Method to detect constant regions," in one example embodiment it is only used for those regions which were not previously determined to be constant color.

Method to Detect Constant Halftone and Texture Regions

Similar texture blocks may be merged into regions. In order to get texture regions, and not just texture blocks, the system and method can consider each of the 32×32 regions mentioned in the section above entitled "Method to detect constant halftone and texture blocks" to be the lowest level of a quadtree, which may then be processed in a manner similar to the section above entitled "Method to detect constant regions," with different values of T, Tcm and Tcv. (The mean and variance of two blocks must each be within respective distances to determine that they are to be joined).

Method to Detect Smoothly Varying (Non-Textured) Background Regions

The background colors can change very slightly from one color to another in the background image. Failure to recognize such change may cause errors. When the background color changes slowly across a document, it is important to recognize and preserve this quality. Failure to do so may result in visible distortions, such as mistakenly dividing the background into several distinct constant color regions.

Accordingly, in an example embodiment of the present invention, after the flat region detection (see the section above entitled "Method to detect constant regions"), the system and method may analyze all the regions that are spatially connected (e.g., each two of the various k×k sections that have been connected to form regions of constant color may be analyzed) to determine if their mean background colors are slowly varying, i.e., their means are very close to each other. If their mean background colors are slowly varying, the system and method may merge them into a smoothly varying background region. Using a background color compression filter, such as DCT (discrete cosine transform), may ensure that this property of edge-free slow background change will be preserved in the encoded image.

Method to Detect Constant Regions with Background Bleed

The background of a scanned color document may contain the bleed of the text on the opposite side of the printed page. In other words, the text on one side of the document may be visible on the other side of the page, where it may be picked up by the scanner. Generally, we do not wish to keep this information and consider it a visible distortion which should be removed from the page. Our method of removing this bleed and restoring the background to its proper color is as follows:

Run a gradient detector with non-maxima suppression on the entire image, and combine neighboring gradient points into connected gradient components. If all the gradient points of a given gradient component are very weak (compared to the median gradient component of the image), and if thresholding the color component contained in the gradient component results in a connected component whose color is only slightly darker than the rest of the background, we have identified a likely background bleed. We can then remove these components from the background, and fill them with the surrounding background values, as explained below in the section entitled "Method to re-construct background layer after foreground has been lifted using neighborhood substitution."

Method to Detect Smoothly Varying and Textured (e.g., Halftone/Screen Patterned) Background Region Texture blocks may be identified as discussed in the section entitled "Method to detect constant halftone and texture blocks," combined into texture regions as discussed in the section entitled "Method to detect constant halftone and texture regions," and smoothly varying backgrounds may then be sought as discussed in the section entitled "Method to detect smoothly varying (non-textured) background regions."

Solving for Foreground Mask

Solving for Foreground Text

In an example embodiment of the present invention, the system and method may first group things that probably have text and then threshold later.

The system and method may lift the background regions, e.g., detected as described in the sections above entitled "Method to detect constant regions" and "Method to detect constant halftone and texture regions," leaving non-background regions of color, e.g., varying or constant. The system and method may combine them into connected components and proceed to analyze them. All connected components with height less than a height threshold Th and with a width less than a width threshold Tw may be labeled as likely foreground text components.

Solving for Foreground Line Art

Even if the connected components do not meet the thresholds of discussed in the section entitled "Solving for foreground text," the system and method may still look at the ratio of the greater of the height and width to the lesser of the height and width. If max(height, width)/min(height, width)>Gr or a ratio of an area of on pixels to bounding a box size surrounding the component is less than Rt, then these components may be considered as likely foreground line art components.

Detecting Text Lines

Likely foreground text components extracted as described in the section entitled "Solving for foreground text" can be grouped together into words as follows:

The image is divided into k×k grid cells. Each cell of the grid subtends an x-y range in the image and contains a list of all the components that have their centroid located inside the grid cell. Then each component looks at every component in the component list of its own grid cell and its neighboring grid cells. The component links to the closest component that is collinear to itself.

One method to determine if two components are collinear is if they share the same top and bottom runs, where a top run has no run on above it, and a bottom run has no run below it.

In the second pass, all the linked components are checked to see if they form collinear lines and are grouped together as tlines, likely text lines. Components on the tlines are sorted using their left bounding box corner and stored in that order.

Detecting Words

To group components into words, for each tline we obtain the distance between the bounding boxes of each component. We histogram these distances and look for two prominent peaks. The smaller of the two peak distances is labeled the inter-letter distance and the other peak distance is labeled the inter-word distance. We revisit all the components on the text line and group all the components together in words that are less than the inter-word distance away from each other.

This histogram curve can alternatively be modeled as the combination of two Gaussian probability distributions, where we solve for the parameters of each distribution.

Detecting Constant Color Text Regions

All lines that either have approximate same starting point or same ending point are grouped together. We sort the lines using their bottom corner point. We then compute the interline distance. The interline distance is used to break the current regions into one or more regions if necessary. The smooth local symmetry (SLS) axis of each connected component in the text region is computed and, using only the points on each component's SLS, we determine the component's median color value in YCbCr space. A color median of all component color medians is then computed (regionColorMedian). All tlines with the same starting point or ending point, i.e., left or right margins, consistent interline distances, and low color variance with respect to the regionColorMedian are grouped together as a likely constant color text region.

Method for Handling Undersampled Documents (Such as Below 50 dpi) from Handheld and Other Low Resolution Devices—Method for Upsampling of Undersampled Documents Prior to Lifting Foreground In an example embodiment of the present invention, the system and method may detect low resolution lines. For the detection, the system and method may, with respect to the non-background connected components which have been grouped together into word and line components, as described above, analyze whether a text height is smaller than some threshold. If it is smaller than the threshold, the system and method may determine that it is undersampled. If it is undersampled, then the system and method may increase the component's height by some multiple so that it is at least the correct height which can be used (the multiple may result in a size greater than the threshold). Once it is upsampled, thresholding may be performed.

Accordingly, for undersampled document images, especially those sampled at cell (handheld) scan rates, special methods may be used to preserve text readability. First, the background region needs to fit a model, such as constant color. Using region growing, as described in the section on segmentation, the background region is "fit" to the image, and pixels not fitting this background model are left on the image. These pixels may then be grouped into connected components. These connected components may be analyzed using characteristics including area, bounding box height and width, color constancy, and collinearity to determine if they are likely to be text components. Likely text components may be grouped into line structures. Using characteristics of the line, including line height, the text line may be labeled as regular or undersampled.

Text lines labeled as undersampled may be grouped into larger undersampled text regions. Undersampled text regions are those where the text is sufficiently small such that readability will not be preserved using MRC compression unless the image is upsampled prior to compression. The undersampled text regions may be analyzed to determine the degree of image upsampling required to preserve readability. A method to compute the upsampling scaling factor S that preserves readability is to determine for each image text region Ri the median text height Hi, i.e., the median height of all components in text region Ri. The system and method may then take the smallest text height Hmin=Min(Hi) and find the scaling factor S that preserves readability of this region after thresholding. This scaling factor S may be computed to be the value that resamples the image such that Hmin is greater or equal to some value, typically either 8, 10, 12. The entire image may then be upsampled by scaling factor S using an integer approximation of bicubic spline interpolation.

Regarding the upsampling in the case of low dpi grayscale or color space, in order for the upsampling to allow for the thresholding, word connected components may be grouped together, rather than character connected components. Accordingly, the system and method may upsample the image such that even the smallest font can be topologically preserved under thresholding.

Once upsampling has been performed, a thresholding method different than that discussed below and which is specific to low dpi space may be used.

Method for Detecting Picture Regions

Images are usually made of background, text, line art, and/or pictures. In this regard, MRC coding allows for multiple layers to be encoded on the same page. The layers typically include a mask layer (which contains textual information and line art), a foreground layer (which colors the mask), and a background layer (which appears beneath the mask). While these separate layers are ideal for color business documents, there are times when it pays to encode a region separately in its own layer, as in the case of pictures. Normally the background layer of an MRC file is encoded in low dpi, which lessens the details. For the background of a business document, such encoding is usually fine. If however there is a picture somewhere on the page, it may be desirable to maintain the higher resolution rather than to lower the resolution of the picture and lose precision. A method is therefore needed to detect such picture regions, and to determine how best to encode them, which will frequently be in a separate layer from the rest of the document.

Above, detection of background, text, and line art has been described. In an example embodiment of the present invention, once those elements have been detected, the system and method may label the remaining regions as pictures.

Accordingly, the first step to detecting picture regions in a document is to remove all non-picture elements from the page. Every pixel in the image can be categorized as belonging to a layer of the MRC compression. Any pixels which will be encoded in the mask layer can be considered as a part of an element of the text or line art. The textual and line art elements, the texture regions, as well as the constant color background flat regions may therefore be removed. Anything which remains can be considered as a likely picture region.

Method for Lifting Text on Picture Regions

In an example embodiment of the present invention, the system and method may lift text in picture regions only if the text forms a well behaved text line.

Minimizing Lifting Non-Text Elements on Non-Picture Regions

In an example embodiment of the present invention, the system and method may refrain from lifting small components in the foreground color layer if they do not form a collinear text line.

Efficient Gradient Computation by Avoiding Smooth Regions

Using detection of gradient points, i.e., edges, is a powerful tool to detect foreground textual and line art components. While an excellent tool for picking up text, gradients are computationally expensive and should be applied only where necessary.

Gradient computation can generally be avoided when the background surface is modeled precisely, as in constant color background. Even when the background surface cannot be modeled by a single constant color, the system and method may provide that the gradient is computed only as needed and not for the entire image (e.g., not in those sections where the smoothed version of the section matches closely to a single constant color). This may provide the accuracy of gradient detection with the speed of much faster methods like static thresholding.

In an example embodiment of the present invention, the system and method may accordingly perform the following algorithm. For each flat region that is detected, the system and method may refrain from computing gradient information at any pixel that is part of the flat region.

Otherwise (if the region is not of a constant color), the image may be divided into k×k cells. The system and method may compute the variance for each cell. If the cell variance is less than some threshold Vb, e.g., 30, 50, or 70, then the system and method may refrain from computing the gradient for the pixels in the cell and may assume there is no relevant edge information for segmentation.

If the variance is above Vb, but is still fairly low and is below a second threshold $Vb_2$, the cell may be divided into four subsections. These subsections may be the four quadrants, four vertical strips or four horizontal strips. If the mean color and variance of all the subsections are similar, then the cell may also be excluded from gradient computation.

Otherwise (if the cell variance is not less than the threshold Vb, or if either the cell variance is not less than the threshold $Vb_2$ or the variance of the subsections aren't similar), the system and method may use gradient point detection for detecting foreground textual and line art components, so that such use of gradient point detection for foreground textual and line art components may be performed conditional upon these conditions.

Selective Removal of Maximal Gradient Points

While maximal gradient points can be useful for finding the boundary of text components, they may also result from texture and noise. Treating such non-textual and non-structural gradient points the same as textual and structural gradient points may result in lifting texture and noise to the mask layer, which will obfuscate it and reduce the clarity of the text. Therefore, once the gradient points for a k by k cell have been found, the system and method analyzes the properties of the maximal gradient points.

Each maximal gradient point is classified based on its eight 8-neighbors. If none of those 8-neighbors are themselves maximal gradient points, the maximal gradient point is classified as a singleton. If only one of its 8-neighbors is a maximal gradient point, it is classified as an endpoint. If two of its 8-neighbors are maximal gradient points and they are adjacent to each other, it is also classified as an endpoint. A k-junction is calculated as follows: Start from the top right 8-neighbor and traverse the eight 8-neighbors in a clockwise direction until the top 8-neighbor is reached. At each step in the traversal, if a move is made from a maximal gradient point to non-maximal gradient point, a counter is incremented. If at the end of the traversal the counter has a value greater or equal to 3, the pixel is classified as a k-junction.

The complexity of the cell is determined in part by whether it has some combination of too many endpoints, too many singletons, too many k-junctions, or too many maximal gradient points. If a given cell is not too complicated we proceed to the next step (maximal gradient connected components), which will be explained in the next section.

If however a cell is too complicated, smoothing will be done on the cell. (The extent of the smoothing may depend on the level of the complexity.) New maximal gradient points will then be computed on the smoothed cell. If the complexity of the cell is below a certain threshold we proceed to the next section. Otherwise we build a histogram of the maximal gradient points in the cell and look for prominent (well-supported, well-defined) maximal peaks. If there is one dominant peak, we classify the cell as completely texture, and all gradient points in the cell are removed. If there is more than one dominant peak, the lightest (i.e. weakest gradient response) such peak is identified as texture, while the second lightest peak is presumed to represent text. Any maximal gradient point which is closer to the lightest peak than to the second lightest peak is removed from the cell.

Forming Maximal Gradient Connected Components

In an example embodiment of the present invention, the system and method may perform a method of merging into a single gradient component two separate components. For example, the gradient component of an 'o' may include in an inner circle and an outer circle, which may be merged into a single component.

Once all the gradient maxima pixels on an image have been computed, the system and method may form their connected components. After finding the gradient connected components, certain overlapping components may be merged together, where components overlap if their bounding boxes intersect. For example, the system and method may merge together the contours of certain components with holes, such as the letter 'O', as well as contours of other components which may have been broken into pieces due to several boundary pixels that have weak gradients. If the degree of overlap of the bounding boxes of the two components is sufficient, then the system and method may merge them.

These connected components may then be analyzed and labeled as either text or line art, according to the methods discussed above. These gradient components may then be used to provide a set of intensity-based constraints used for thresholding, which is discussed below.

Using Gradient Ribbons for Segmentation

There are various criteria for determining within a likely text region whether a gradient component is text or line art, both of which need to be lifted into the MRC text (mask) layer, or whether it is texture, which should be left on the background layer.

One such method makes use of the gradient component ribbon width. Determine the region ribbon width by traversing the all the gradient components in the region in raster scan order, measuring the number of pixels between each pair of ascending and descending gradient pixels, and adding that value to the set of widths found. The median width of these values (alternatively the mean or mode) is considered to be the gradient region ribbon width. Having determined this median ribbon width, only components of approximately this width are labeled as text and lifted to the mask layer.

Another implementation would only include pairs of ascending and descending gradient pixels whose tangent directions match.

Fusion of Gradient and Model-Fitting Methods For Improved Segmentation

General Thresholding Methods

Segmentation-Based Thresholding Methods

Method to Threshold Components Using Gradient Components

Thresholding is differentiation between foreground and background, generally by picking a threshold value for the determinations.

Gradient point may be measured. For example, if the foreground is blue and the background is yellow, then at the boundary point, there will be a sharp change in color, and therefore a strong gradient response. The system and method may mark those points as gradient points.

Once the gradient points are obtained, the system and method may find connected components of gradient points, which may be assumed to trace a boundary of an item. The system and method may then pick a single threshold value for the entire item connected component based on the values of the gradient points.

The system and method may threshold every gradient component which has been determined to be textual or line art, thereby forming a foreground component.

Every gradient point in the gradient component may be assumed to be on the boundary between the foreground and the background. The system and method may therefore determine the parallel direction to the gradient direction, i.e., the tangent direction, and pick one pixel on each side of the considered gradient point pixel in the parallel direction, as shown in FIG. 1, one of which it is assumed will be darker than the other. The system and method may label the lighter of the intensity values $Pi\_L$ and the darker of the intensity values $Pi\_D$, and place these two values in separate arrays, each array including a plurality of like values (i.e., either $Pi\_L$ or $Pi\_D$) for each of the pixels of the connected component. Accordingly, assuming there are N gradient points on the gradient component, there may therefore now be a corresponding N pairs of lighter and darker points (which will tend to be the interior and exterior points). That is, the sets of points may include $S\_L=\{P1\_L, P2\_L, \ldots, PN\_L\}$ and $S\_D=\{P1\_D, P2\_D, \ldots, PN\_D\}$.

Next, the system and method may take $vL=\min(S\_L)$ (the value in the light array that is the darkest, i.e., it has the smallest of the light array values) and $vD=\max(S\_D)$ (the value in the dark array that is the lightest, i.e., it has the greatest of the dark array values). It is noted that the light color values are greater than the dark color values. For example, black is 0 and white is 255.

If $vL>vD$ (meaning the two sets do not overlap) then all the gradient constraints yield a consistent intensity solution (that is, any value that is above the lightest of the dark and below the darkest of the light, e.g., the average of the two, can be used as the threshold value). Accordingly, the system and method may, in this case, select threshold $t=(vL+vD)/2$ as the intensity threshold for the component. However, this is usually not the case. Accordingly, if $vL<=vD$ (meaning there is an overlap), we find which rank r values $vL\_r$ (the rth min of vL) and $VD\_r$ (the rth max of vD) are such that $vL\_r>vD\_r$. If $r>95\%$, then the system and method may select threshold $t=(vL\_r+vD\_r)/2$.

If for rank $r=95\%$, it is still the case that $vL\_r<=vD\_r$, the system and method may consider this as indicative of either 2 or more foregrounds, 2 or more backgrounds, or an undersampled text region, so that the system and method may refrain from selecting a threshold using this method.

Method to Threshold Words Using Gradients

Every letter should have its own gradient curve. The system and method may find a first threshold for one letter and a second threshold for another letter. However, it is also possible to get multiple curves in a word and then calculate a single threshold value for the entire word, and even for an entire line (line is discussed in the next section). The thresholds determined for such larger regions may be more reliable than those for individual letters.

In an example embodiment of the present invention, such threshold determinations for larger regions may be performed using a method analogous to that discussed above in the section above entitled "Method to threshold components using gradient components." However, the threshold values may be found for each word instead of merely for each individual component. The word gradient component used to threshold a word may be the union of all the gradient connected components that form the word.

To determine which groups of gradient components are of a single word, the system and method may find the distance between gradient components. For large distances, it can be assumed that the components are of different words; for smaller distances, it can be assumed that the components are of a single word. This is just one exemplary method for finding those components of a single word.

Once it is known that components are of a single word, the system and method may generate the arrays discussed above, i.e., a single dark array S_D and a single light array S_L for all the gradient components of the single word. Using these arrays, the system and method may determine the threshold value according to the method described above in the section above entitled "Method to threshold components using gradient components" with respect to the individual components.

If a value that would satisfy the word as a whole cannot be found, e.g., for rank r=95%, it is still the case that vL_r<=vD_r, then the system and method may attempt it for the components locally.

Method to Threshold Lines Using Gradients

Similarly, in an example embodiment of the present invention, the system and method may select threshold values on a line basis, instead of merely for individual words or components. The line gradient component used to threshold a line may be the union of all gradient connected components that form the line. Whether the line, the word, or the individual component is used, may depend on whether a satisfactory value is found.

Method to Threshold Text Regions Using Gradients

Similarly, in an example embodiment of the present invention, the system and method may select threshold values on a text region basis, where the text region encompasses more than individual lines. The text region gradient component used to threshold a text region may be the union of all gradient connected components that form the text region. Whether the region, the line, the word, or the individual component is used, may depend on whether a satisfactory value is found.

Thus, the system and method may find the largest component (e.g., region, line, word, or individual component) for which a satisfactory value can be found.

Method to Threshold Large Structures Using Gradients

With a very large component or structure, such as a grid, the system and method may threshold each k by k cell individually, and not the entire component together. Each k by k cell will be treated as a separate component for verification purposes as well, as will be described in the next section.

Method to Verify Gradient Threshold Correctness and Determine Component Polarity After finding a threshold value, the system and method of the present invention may determine which side of the threshold value belongs to the foreground layer and which side of the threshold value belongs to the background layer.

In an example embodiment of the present invention, after the system and method determines the threshold value, e.g., using the gradient components, the system and method may apply the bounding box around the gradient component in the gradient image to the same position in the original image. The system and method may apply the threshold to the bounding box applied to the original image, such that, for each pixel in the bounding box, if the pixel's value is greater than the threshold value, the system and method may assign to the pixel a value of 1, for example, and otherwise, a value of 0.

To auto-check that the selected threshold value is a good one, the system and method may, e.g., using the Hausdorff rank 95 matcher, match the new component just created using the threshold value in the bounding box to the corresponding gradient component of the gradient image from which the bounding box was obtained.

If there is a match, it may be assumed that the threshold was correctly selected and that the polarity (which side of the threshold value is foreground and which side of the threshold value is background) is correct since, if the background had been treated as foreground and vice versa, then the match would likely not have been found.

If the match fails, the system and method may reverse the polarity and re-perform the matching. (Alternatively, the system may match both polarities in all situations and select the better of the two.)

If the match fails even after revering polarity, then it can be assumed that either the selected threshold was wrong or there is no threshold value that can be used. The system and method may therefore determine that this gradient component should not be thresholded by default.

Accordingly, the threshold determining methods described above using the S_D and S_L arrays assume that the gradient component has a consistent solution in that the interior pixels of the gradient component have a constant color and that the exterior pixels have an intensity that is either consistently lighter or darker than the interior pixels. A consistent solution to those methods implies a Hausdorff or rank Hausdorff match (rank 95) of distance 1 between the image gradient points and the thresholded intensity boundary points, assuming that the polarity is correctly solved for. Polarity is defined as video if the darker points are thresholded to foreground and reverse video if the lighter points are thresholded to foreground.

The system and method can determine the polarity of a thresholded component by checking which polarity value, video or reverse video, yields a greater rank Hausdorff match, where the greater rank is given by r_p. The rank r used to find a consistent threshold t, as in the methods described above using the S_D and S_L arrays, is already known. If r=r_p then it is assumed that the polarity of the component has been correctly determined and that the correctness of the threshold value has been verified.

Testing for Non-Color-Constancy Using the Non-Matching of Gradient and Intensity Constraints If the gradient map and the intensity map within the bounding box do not match when performing the matching with respect to both polarities, then it may be assumed that there is not a constant color in the section and that a threshold value cannot be used. Instead, the system and method may keep the section in the background layer, i.e., it will not be lifted into the foreground layer and may have a reduced resolution.

A consistent solution of the gradient component's intensity constraints, as described above with respect to the S_D and S_L array methods, reinforces the MRC model of constant background text on a slowly varying smooth background region. An inconsistent solution implies that the MRC model is not locally applicable. One such reason for the inapplicability of the MRC model is foreground non-color-constancy. When no consistent solution is found that is rank 95% or above, it implies that either the foreground is not an approximately constant color or that the background is not an approximately low-frequency smoothly varying surface.

Method to Detect/Threshold Text on Texture

In an example embodiment of the present invention, where there is a textured background, a variation of the thresholding method can be used. First, the system and method may determine whether the background is textured, e.g., as discussed above in the section entitled "Method to find halftone screens and texture before smoothing," which may include computing the gradient components.

In an example embodiment of the present invention, the system and method may always smooth texture before lifting the text on texture regions. If there is texture, then the region may be smoothed and then the gradient recomputed.

The system and method may check for two peaks in a histogram of the recomputed gradient. The histogram may show the intensity values, where the greater the value, the greater the gradient, for example, along the x axis, and may show along the y axis the number of pixels having the gradient value plotted along the x axis.) The peaks are the two greatest values plotted with respect to the y axis and correspond to the two intensity values shared by the greatest number of pixels in the region. The peak with the weaker gradient strength is assumed to be textured background. Those pixels having that value may then be eliminated from the gradient points.

If only one peak exists and most of the points of the block are weaker than some threshold, then it may be assumed that the entire region has only textured background, so that all of the points of the region are eliminated from the gradient map.

That is, the gradient strength of texture is usually weaker than the text strength. An image may be divided into k×k cells. The system and method may look for all the cells in a texture region that have two different prominent gradient strengths. For such cells, the system and method may eliminate weaker gradient points if they don't form any significant smooth structure. The system and method may lift stronger gradient points as text components if they form well-behaved smooth curves.

Method to Determine Component Polarity Assuming a Flat Background

In an example embodiment of the present invention, where there is a flat background, the system and method may generally refrain from calculating gradient components, as described above.

But, in example embodiments of the present invention, the system and method may calculate gradients and perform the thresholding methods described above using the S_D and S_L arrays. In such cases, as an alternative to determining polarity using the Hausdorff matcher described above in the section entitled "Method to verify gradient threshold correctness and determine component polarity," the system and method can use the following method.

Using the computed threshold t, the system and method may partition the intensity pixels in the bounding box corresponding to the gradient component into two sets sD and sL, where sD is the set of darker pixels and sL the set of lighter pixels. The system and method may compute mD and mL as the means of sD and sL, respectively and compare mD and mL to the background mean mB. If |mL−mB|<=|mD−mB|, then the system and method may determine that the component polarity is video and, otherwise, that it is reverse video.

Method to Threshold Components Using Flat Background and Gradients

In an example embodiment of the present invention, the system and method may perform a method that combines the features of the S_D and S_L array methods and the method described in the section entitled "Method to threshold components using assuming flat background."

Matching & Refinement

Method for Using Perceptually Lossless Bitonal Mask Layer

All of the features for perceptually lossless bitonal compression described in the document entitled "Computer Vision-Based Methods for Enhanced JBIG2 and Generic Bitonal Compression," the entire disclosure of which is incorporated herein by reference and which is attached hereto, can be used for the mask layer of an MRC image.

Encoding

Pushing Every Component to a Single Constant Color, Wherever Possible

With respect to foreground, a goal is to get a component to a single color. The original image may include other colors at the borders, for example. So in an example embodiment of the present invention, the system and method may get rid of this.

Every pixel in the foreground mask may have a color value associated with it. The values of those pixels on the boundary are not of much interest. Accordingly, the system and method of the present invention may break components into interior and exterior points. If there are sufficient interior points, the system and method may ignore the exterior points.

Accordingly, once the foreground in segmented into components, the system and method may choose the appropriate color for each of these components. If a component has sufficient interior pixels, the system and method may place the interior pixels into a sorted vector based on intensity and analyze them to see if whether the entire component can be pushed to a single color.

The analysis may be performed in the following manner. The system and method may calculate a chosen Rth, e.g., $90^{th}$, percentile darkest and lightest pixels. If the intensity difference between these two pixels is determined to be less than a threshold T. e.g., 80, and if the intensity variance of all the interior (non-boundary) pixels is determined to be less than a threshold V, the system and method may responsively choose a single color to represent the component. This color may be set as the mean of all the interior pixels in RGB space. Alternatively, the color may be set as the median color of the component's SLS axis.

For thin components which don't have sufficient interior pixels, the system and method may place all the pixels into a sorted vector based on increasing intensity and then determine the polarity of the component, for example as discussed above. If the polarity is video, the system and method may take all the dark pixels in the bottom Rd, e.g., 10, percentile (the bottom percentile having darker pixels than the higher percentiles since dark pixels are of a lower value than light pixels). If the polarity is reverse video, the system and method may take all the light pixels in the top R1, e.g., 10, percentile. The system and method may then take the mean value of all these pixels in RGB color space to represent the component.

Once a single color is found to represent the component, the system ad method may give every pixel in the component that color.

Remap Perceptually Grouped Color Components to the Same Single Constant Color

Using the method described in the section entitled "Pushing every component to a single constant color, wherever possible," it may occur that neighboring components in a document will be pushed to slightly differing colors, even when in the original printed document the two components shared the same exact color. To both improve the image quality of the document and to better improve the compression ratio, it pays to give all such components the same color wherever possible. This, however, can be a risky operation, for if two components are mistakenly pushed to the same color, the image can be distorted. Accordingly, the system and method may proceed cautiously in a systematic manner.

In this regard, the system and method may first determine if all the components in a word can be pushed to the same color. If they can be, the system and method may then determine if all the words on a line can be pushed to the same color. If they can be, the system and method may then determine if all the lines in a paragraph or region can be pushed to the same color. The following may performed to make these determinations.

With respect to pushing all the components of a word to the same constant color, the system and method of the present invention may first group components into words and then determine if the components of the word can all be pushed to a same constant color. That is, the system and method may, for each word, extract all of the word's components which have already been pushed to a constant color. Any component of the word which had not been pushed to a constant color will be ignored in this operation, and will be left with its multitude of colors. The system and method may create a sorted vector (in intensity space) of the colors found in the various considered components of the word. In one example embodiment, the system and method may place in the vector only one pixel from each of the considered components. In one example embodiment, pixels from very small components may be left out of the vector. (In an alternative example embodiment, the system and method may place every pixel of all of the components, including the small components, in the vector. In yet another alternative example embodiment, the system and method may place more pixels from the larger components into the vector than from the smaller components, where the number is not necessarily fully proportional to the number of pixels in the component.)

The system and method may take the median pixel of this vector and compare each component's color to the median. For those that are at a distance greater than some threshold, those components' colors may be maintained. The system and method may compute the median of the remaining components and use its color to represent the whole word, e.g., but for those having colors that are to be maintained. Alternatively, the system and method can use the initial computed median to represent the whole word, but for those having colors that are to be maintained. In one embodiment, the pushing of the remaining components to the median may be performed conditional upon that less than a certain percentage of the components were found to have been further than the threshold distance from the median.

The same method used to push all the components in a word to the same color value may also be used to push all the words in a line to the same color value. Alternatively, where there is no word information, the system and method can directly push all the components in a line to the same color using the same method. The system and method can frequently then proceed from the line level to the region level, thereby pushing all the lines in a region to the same color.

Utilizing Multiple Foreground Maps

With MRC compression, the foreground is generally represented by combining the information of two layers. The mask layer determines which pixels will be in the foreground, while the color foreground layer determines how to color the pixels of the mask layer. In order to save bytes, the foreground color layer is usually represented by a low res (resolution) image, which is typically an 8 to 1 reduction from the original image. A problem arises when two very different colors are in close proximity within the foreground layer. This can be especially troubling when some pixels are video and other pixels are reverse video, and they both neighbor each other in the mask. In fact, it can even occur that these two very different colors are meant to both be represented by the same foreground low res color pixel. This would mean that at least some of these pixels will be represented by a very inappropriate color value.

Embodiments of the present invention provide several ways of identifying such problems and resolving them. These techniques include computing the foreground color gradient or variance. Then, if the variance is greater than some threshold for some local region (e.g., a region corresponding to a single pixel in the foreground low res color), the system and method may spawn multiple foreground layers to resolve this problem.

In an alternative example embodiment of the present invention, to resolve multiple foreground colors in proximity, the system and method may upsample the foreground image color layer iteratively, by a factor of 2 in each iteration, until the resulting color gradient or variance is below a given threshold. For example, instead of having a single pixel of the foreground layer representing an 8×8 of the original, it will represent only a 4×4 after the first iteration.

Eliminating Flat Background when MRC Coding

When a rectangular flat region of background pixels share a similar color (flat means share a similar color within a certain tolerance of each other), the system and method can push all the pixels in that region to the same color, e.g., the mean color of the pixels. When writing PDF files, for example, instead of then encoding that region as an image within MRC, the system and method can use a PDF command to paint the region with that color.

Method to Remap Color Scans of Black/White Images to Black and White Image Format Frequently a grayscale image will be scanned in color mode, which may then misinterpret some pixels as having values other than grayscale values. In an example embodiment of the present invention, the system and method may identify such situations, may identify all the pixels in the foreground, and may remap all the pixels in the foreground to grayscale values, thereby saving bytes and improving image quality.

The system and method may do this by determining whether all of the pixel values in the foreground layer are within a tolerance of a grayscale value. If they are, the system and method may push all those pixels to the nearest grayscale value.

Similarly, when a Black and White image is scanned in color or grayscale mode, some pixels may be misinterpreted as having values other than Black and White. In this case, the system and method may remap all pixels to a Black or White value. To do so, the system and method may determine whether all of the pixel values in the foreground layer are within a tolerance of a black or white value. If they are, the system and method may push all those pixels to the nearest black or white value.

In fact, whenever a document contains only two colors, the system and method may both save bytes and improve image quality by pushing all the pixels in the foreground to one of those two colors, for example by choosing the mean of the background and foreground colors and testing whether the distance of the values of the pixels are within a threshold distance from the mean value. Alternatively, for the foreground, instead of using the mean as with the background, the median color may be used.

Method to Re-Construct Background Layer after Foreground has been Lifted Using Neighborhood Substitution In MRC compression, the foreground layer is placed above the MRC background layer. Even when the foreground pixels have been removed from the image, a value is still needed for those removed pixels even in the background layer. Leaving those pixels with the value of the foreground pixels may lead to blurring artifacts that can hurt the readability of the image because of the nature of compression algorithms that may be used to encode the background layer.

Accordingly, in an example embodiment of the present invention, the system and method may determine the value for those pixels in the background layer using the following algorithm.

The system and method may dilate the mask pixels by one for computation purposes. To do so, the system and method may find all of the boundary black pixels. A boundary black is where the pixel is black and one of its neighbors is white. The system and method may center each boundary black pixel in a 3×3 cell and paint the rest of the 3×3 cell also to black (some might already have been black in the original mask). Any pixel of the original image which now corresponds to positions covered by the dilated mask may have its original value removed. The system and method may then proceed in raster scan order and give each of those "removed" pixels a background color value which is the average of all the previously visited ones of the considered pixel's neighboring background pixels (meaning the 4 preceding neighbors—three above and one to its left—and any other of its 8 neighbors which did not fall within a dilated pixel and which therefore retains its background color value). This new value may be considered as an original background pixel value for all subsequent pixels. The system and method may then proceed in a second pass in the reverse raster scan order (bottom up, right to left), revisit each of those pixels, and give them the average of the values of all its neighbors and the considered pixel's previously assigned value as calculated in the first pass.

Method for Color Spreading of Foreground Layer for Better Compression

Similarly, the same can be performed with respect to filling in those portions of the foreground layer for which the mask layer does not include corresponding pixels. That is, the same problem arises for the foreground layer for the reverse reason of the background layer.

In the foreground color layer, each pixel represents a k×k number of pixels in the mask, since the foreground layer is a low res layer. The color of that pixel should be the one which best approximates the color of the high res pixels in the image which were included the mask. However, it is possible that a pixel in the foreground color layer may not have any mask pixels within the k×k region that it represents. If at least one of the pixels of the corresponding k×k in the mask is of the foreground, then the at least one pixel's value can be used for the color in the corresponding single pixel of the foreground layer.

In such a situation the system and method may give a color to those pixels both to improve image quality and to save bytes. Leaving those pixels as white may distort the color of those pixels which neighbor it, and will require the expensive jpeg costs of transition from a color to white and then back again.

To assign the colors, the system and method may use the same algorithm discussed above with respect to filling in the background layer. The system and method may proceed in raster scan order to give each empty pixel the average value of its visited neighbors, etc.

Method for Determining when to Merge, Split, or Drop (into Background) Foreground Color Clusters In an example embodiment of the present invention, even when a text has been properly identified and lifted into the foreground, the system and method may, at times determine that, for compression purposes, it pays to leave the text in the background, and may accordingly do so. For example, if the mean stroke thickness of the text is great enough, the system and method may drop the text into the low res background layer without at all affecting image quality. As the mask layer can be expensive, such a method to decrease the number of pixels in the mask layer may be worthwhile.

Terms

Gradient

The gradient of a pixel is a measure of how quickly the values neighboring the pixel are changing in each of the four directions: horizontal, vertical, left-diagonal and right-diagonal. The left-diagonal goes from the top left to the bottom right, and is the diagonal with a negative slope. The right-diagonal goes from the bottom left to the top right, and is the diagonal with a positive slope. Those pixels which neighbor a sharp change in the image, such as those on the boundary of a textual component, may have a strong gradient response, while pixels in a completely constant color region may have no gradient response and those in a smoothly varying region may have a very slight gradient response.

Maximal Gradient Points

The gradient of a pixel is calculated in four directions (horizontal, vertical, left-diagonal, and right-diagonal) and the direction with the strongest gradient is chosen, with that greatest gradient value assigned to the pixel. We then check the gradient value of the two neighboring pixels in the chosen direction. For example if the horizontal direction is chosen, the pixel to the right and the pixel to the left are both checked. If the left-diagonal direction is chosen, the pixel to the top left and the pixel to the bottom right are both checked. Only if the pixel has a greater gradient value than its two neighboring pixels in the chosen direction can it be considered a maximal gradient point. Since non-maximal gradient points are generally removed, "maximal gradient points" in our invention may occasionally be referred to as simply "gradient points".

RGB, Intensity

MRC coding can be useful for both color and grayscale images. With color documents, there can be three bytes for each pixel, with one byte each for the red, green, and blue values. This is commonly referred to as RGB space. Some of the image analysis techniques commonly used for MRC compression can be very CPU intensive and may run very slowly in RGB space. It can therefore pay to transform the image to grayscale for analysis purposes, and deal with the color values at a later point. A transformation used for this purpose is intensity space, which measures how dark or light each pixel is. A common formula used to convert a single RGB pixel to its intensity value is: V=(30*R+59*G+11*B)/100. Black pixels have an R, G and B of 0, and therefore have an intensity of 0. White pixels have an R, G and B of 255, and therefore have an intensity of 255. Darker pixels have a lower intensity value than lighter pixels.

Variance

Variance refers to a measure of how different a range of values are from each other and may also refer to Mean Square Error.

Smooth

Smoothing is when you give each pixel a value that is the determined by a matrix of its neighboring pixels. A common smoothing technique is a Gaussian blur, which uses a Gaussian distribution with radius R to calculate the percentage of the value a pixel gets from each of its neighbors within the radius.

Halftone

Halftone is the use of black and white to simulate grayscale values, often by use of a dithering pattern. Halftoning may also allow simpler colors to simulate more complex colors.

Texture

Texture can refer to repeated patterns which appear in the background of the image, which can sometimes give the 3D illusion of the page containing depth. Texture can refer to a pattern of colors to provide the appearance of a single color.

Downsample

To resample a region by lowering the resolution and giving each new low res pixel a value which is the average of the high res pixels it represents. The reverse operation is called upsampling.

Polarity

Dark text components on a lighter background has regular polarity. Light text components on a darker background has reverse polarity, which is commonly called reverse video.

Thresholding

Selection of a threshold value for determining which pixels to turn ON and OFF in the mask layer. Determination of what pixels get turned ON and OFF can be determined by a combination of the threshold value and polarity. With regular polarity, those pixels below the threshold are turned ON. With reverse polarity, those pixels equal to or above the threshold value are turned ON.

In summation, an image may be segmented into a foreground layer, a background layer, and a mask layer. The mask layer may be used to determine which pixels are to be assigned pixel values of the foreground layer and which pixels are to be assigned pixel values of the background layer. The foreground and background images may be of low resolution, while the mask layer may be of high resolution. The high resolution mask may then be used to reconstruct the image at high resolution using the values of the background and foreground images.

Example embodiments of the present invention provide for use of gradient points for determining the mask layer. However, use of gradient points potentially slows down processing time. Therefore, in an example embodiment of the present invention, the system and method may initially perform preliminary steps to determine whether to implement the process which uses the gradient points.

Figure 2:
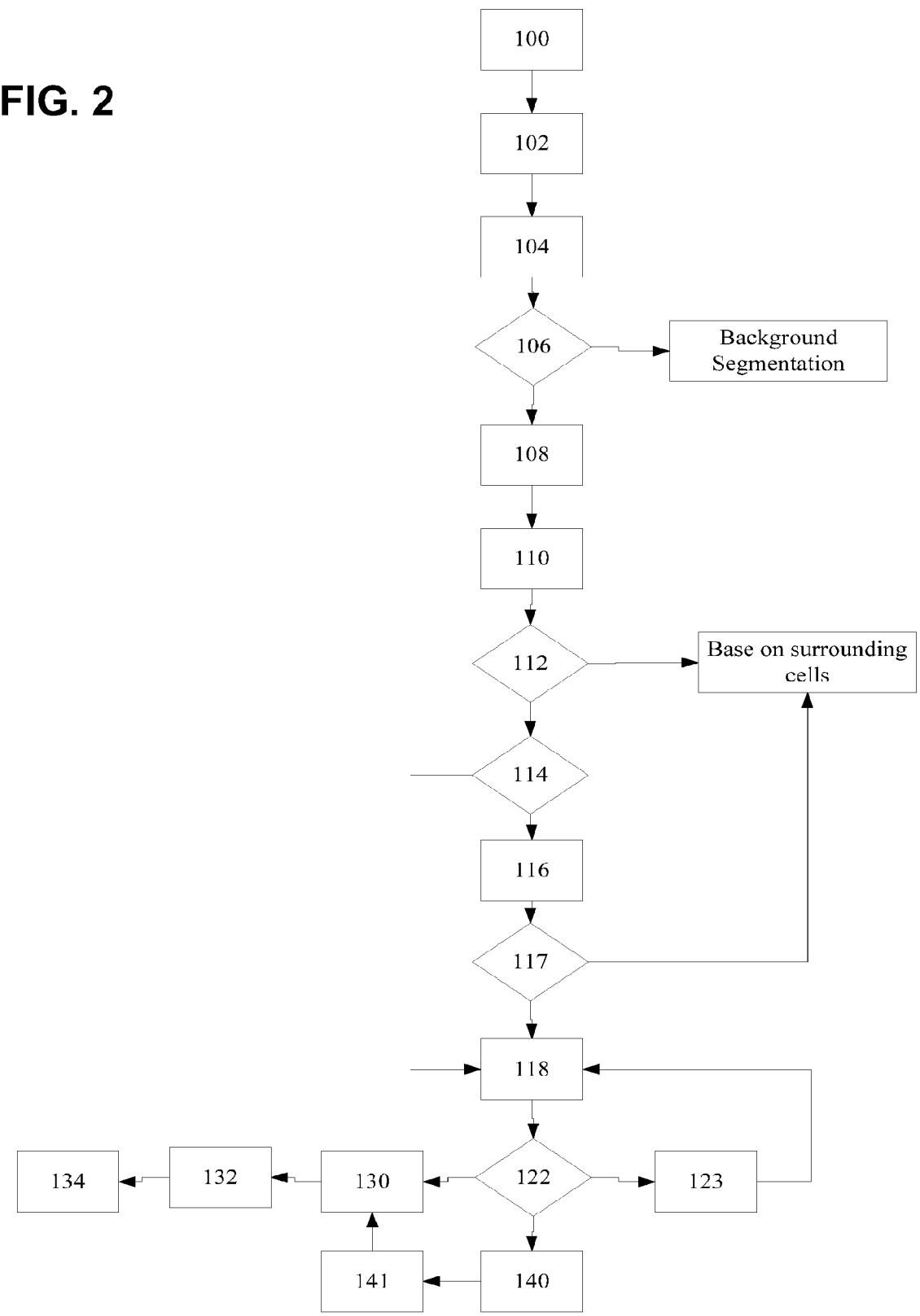
FIG. 2 is a flowchart that illustrates steps of a method for constructing a mask layer of an image, according to an example embodiment of the present invention.

Accordingly, referring to FIG. 2, a method for constructing a mask layer of an image may include the following steps.

At step 100, the system may convert an input image into a grayscale image. At step 102, the system may generate a histogram plotting, for each of a plurality of pixel values, the number of pixels of the grayscale image having the value. For example, the image may have pixels whose values range between 0 and 255. Each of values 0 to 255 may be plotted, and, for each plotted value, the histogram indicates the number of pixels of the grayscale image having that value.

At step 104, the system may determine the peak of the histogram representing the value having the greatest number of pixels to which any single value is assigned. At step 106, the system may determine whether at least a predetermined percentage (e.g., a majority) of the pixels are assigned values that fall within a predetermined range of the determined peak value. For example, the predetermined percentage may be 50% and the range may be those values that are within 15 below and above the peak value. For example, if the peak value is determined to be 70, the system may determine whether at least 50% of the pixels of the grayscale image are assigned values within the range of 55 to 85.

If it is determined that at least the predetermined percentage of the pixels are assigned values that fall within the predetermined range of the determined peak value, then the generation of the mask layer may be performed without use of the gradient points and using a background segmentation method, which finds the flat background.

Otherwise, the system and method may use gradient points in an edge segmentation method beginning at step 108. At step 108, the system may segment the grayscale image into k by k cells, k being a predetermined number, e.g., 32.

For each of the cells, the system may, at step 110, compute the variance of the cell, where the variance is a value indicating the extent of value change across pixels of the cell. At step 112, the system may determine whether the computed variance is at least a predetermined threshold value. If the variance is below the threshold value, so that the colors of the cell are close in value, the colors will probably be all background or all foreground. Therefore, the cell may be subsumed into the surrounding cells to obtain their colors at a later step in the process, after the colors of the surrounding cells have been determined.

If the variance is above the threshold value, the system may, at 114, determine whether the computed variance is at least a second higher threshold value. If it is below the second higher threshold value, the system may perform further steps to determine whether the cell is texture, e.g., a screening pattern, by analyzing subsections of the cell. Accordingly, at 116, the system divides the cell into subsections. For example, the system may divide the cell into quadrants, into four vertical strips, and/or into four horizontal strips. At 117, the system compares mean color and the variance values of each of the subsections to those of the other similarly divided subsections and to the overall cell. This comparison is performed for at least two types of subdivisions, and, in an example embodiment, for three types of subdivisions, for example, for the quadrant subdivision, the vertical strip subdivision, and the horizontal strip subdivision.

If, for the compared subdivisions, the respective subsections are determined to be within a predetermined range of each other with respect to the compared values, the cell may be assumed to be texture. Accordingly, if they are within the predetermined range, the cell may be skipped and subsumed into surrounding cells, for example, as described above.

If the cell is determined, at 114 to be above the second threshold or if it is determined at 117 that the subsection values are not within the predetermined range, the system, at step 118, examines each pixel of the cell to determine the cell's gradient points via any suitably appropriate gradient computation method.

For the computation, the system may compute for every pixel, the pixel's gradient direction and value. For example, the system may check how the pixel changes vertically, horizontally, and diagonally. For example, to check for vertical changes, the system may sum the pixel values of the 3 pixels above the subject pixel, including the pixel directly above, the pixel to the above-right, and the pixel to the above-left, and compare the sum to the sum of the 3 pixels below the subject pixel, including the pixel directly below, the pixel to the lower-right, and the pixel to the lower left. The difference in sums is the vertical gradient for the subject pixel. The system may do the same for horizontal, taking the right three pixels and the left three pixels. For diagonal gradient, the system may consider, for the first diagonal, the sum of the pixel immediately above the subject pixel, the pixel the immediate left and the pixel to the top-left and compare the sum to the sum of the values for the pixel to the immediate right, the pixel immediately below, and the pixel to the bottom right. For the second diagonal, the system may consider the sum of the values of the pixel immediately above, immediately to the right, and to the above-right and compare the sum to the sum of the pixel immediately below, the pixel to the immediate left, and the pixel to the bottom left. Whichever direction for which the system computes the highest change, the system may consider to be the pixel's gradient direction. Further, the value of that highest computed change is the gradient value of the pixel.

After the gradient value and direction of a pixel is determined, the system compares the gradient value of the subject pixel to the gradient values of the pixels which neighbor the subject pixel in the gradient direction of the subject pixel. For example, if the gradient direction of the subject pixel is vertical, then the gradient values of the pixel immediately above the subject pixel and the gradient value immediately below the subject pixel. If the gradient values of either of the neighboring pixels in the gradient direction exceeds the gradient value of the subject pixel, then the subject pixel is not considered a maximal gradient point and therefore does not remain considered as a gradient point. That the neighboring pixels' gradient directions differ from the subject pixel is not considered. Additionally, if the gradient value of the subject pixel is below a threshold, the subject pixel is not considered a gradient point. Otherwise, the subject pixel is initially considered a gradient point, subject to change.

After computing the gradient points for the cell, the system determines, at step 122, whether the cell is overly complex with respect to gradients. If overly complex, the system smoothes the grayscale image with respect to that cell at step 123 and returns to step 118 to re-perform the gradient computation steps described above as applied to the new grayscale image with respect to the cell.

For the complexity determination, the system determines for each k by k cell, whether the cell has greater than a certain threshold number of gradient points, in which case the cell is considered too complex. The number of gradient points may be computed by a weighted combination of various gradient point types. For example, the gradient points may include singletons, endpoints, and k-junction points, different ones of which may be differently weighted when computing the sum of gradient points in the cell.

If the cell is found to be complex, the system considers the cell to be texture and smoothes the cell at step 123. The smoothing can be done via any suitably appropriate smoothing method. The system then returns to step 118 after the smoothing for re-examination of the cell's gradient points according to the method steps described above. After the smoothing, some of the gradient points may be removed in the next pass through the steps since smoothing results in weaker gradient points.

If, at step 122, it is determined, whether prior to any smoothing or after a single performance of smoothing, that the cell is not too complex, the system proceeds to step 130.

If after performance of a smoothing, the result of the complexity determination at step 122 is that the image is still complex, the system may perform the following.

If a cell is still labeled as texture/noisy, the system, at 140, computes the histogram of the cell's maximal gradient points. This histogram indicates for each gradient value, the number of maximal gradient point pixels having that value.

At step 141, the system modifies the gradient points of the cell based on the histogram. The system determines all the dominant peaks in the histogram. A peak is considered dominant if its peak value is above a threshold P, and it is greater than all of its neighboring values within a distance D, which is frequently 10.

If there is only one dominant peak in the histogram, mostly composed of weak maximal gradient points, the system removes the gradient pixels from the cell. If the dominant peak is at a high level, then the system keeps all gradient points of the cell.

If there is more than one dominant peak, then the system removes all maximal gradient points closer in value to the weakest dominant peak than to the second weakest dominant peak. For example, if there is a peak at value 70, which is the lowest peak, and there is a higher peak at value 150, which is the second to lowest peak, then the system removes all gradient points below 110.

At step 130, the system forms connected components using the remaining maximal gradient points. In other words, the system merges connected gradient points into a single object.

At step 132, the system merges overlapping gradient components (e.g., middle of letter "o") and other separated components. In other words, if the letter O is thick, the letter will result in a first connected component of the outer boundary of the letter O and then another connected component which is the inner boundary of the letter O. Look at bounding boxes of the connected components. If they significantly overlap, then they will be merged. In this case, the O is completely merged.

At step 134, the system classifies the connected components (also referred to as gradient components) as text, line art, or noise by examining the component features, including area, height, width, stroke thickness, Euler number (Euler number is the number of holes in an object, for example), etc. For example, text has certain properties in terms of area and height to width ratio, etc., which can be used for this classification.

After the connected components are determined, the system may generate the MRC mask image as follows.

The system visits all the gradient components. If component is labeled as a text component, the system thresholds the component using gradient constraints as follows. Create two histograms, one for lighter pixels and one for darker pixels. In other words, for the gradient direction of each single pixel of the connected component, take each neighboring pixel of the gradient point pixel, one neighbor usually being lighter than the other neighbor. For example, if the pixel is a gradient point in the vertical direction, take the pixel above and the pixel below the subject pixel, one usually being lighter than the other.

Get the intensity value of the two adjacent pixels from the grayscale image in the gradient direction, generally perpendicular to the gradient perimeter, and identify which is lighter and which is darker. Label the lighter pixel as L and the darker pixel as D. Proceed to check the pixel adjacent to the lighter pixel L in the gradient direction and away from the current gradient point P. If this pixel is lighter than the L, mark this pixel as L. Likewise, check pixel adjacent to the darker pixel D, in the gradient direction and away from the current gradient point P. If this pixel is darker than the D, mark this pixel as D. Place L into the lighter histogram and D into the darker histogram.

After the arrays of dark and light pixels are generated for the connected component as a whole, subsequently find a threshold T, where T is the value which maximizes the sum of the number of darker pixels below T. i.e., darker than T, and the number of lighter pixels greater than or equal to T. i.e., lighter than or equal to T.

Then, use the value T to threshold the bounding box of the grayscale image (also referred to as the intensity space) that corresponds to the connected component and add the pixels below the threshold (the pixels darker than the threshold value) as black pixels in the mask.

If a component is labeled as line art, then, divide the component's bounding box into k by k cells. If a given k×k cell has any gradient points that belong to this component, threshold the cell and update the mask image using gradient constraints, i.e., using the neighboring pixels in the direction perpendicular to the gradient perimeter, as described above for text components.

Finally, if a component is labeled as noise, the system does not threshold it. Instead, it is considered part of the background.

Form thresholded connected components using the obtained mask. For each thresholded component, the system then decides whether it is correct and should remain in the mask layer. If it is reverse video, e.g., light text on dark background, then the system removes the thresholded component and places its inverse into the mask layer To determine whether the thresholded component is correct, the system then determines whether the perimeter of the thresholded connected component fits well with the perimeter of the connected component of the gradient pixels. If there is not a good match, then maybe it is reverse video. Therefore, the system tries the reverse. If it still does not match, then the thresholded component is dropped from the mask completely.

Accordingly, the system visits all the thresholded components in the mask. The system identifies a component as 'text', 'line art', or 'noise' using its area, height, width, stroke thickness, Euler number, etc.

If a component is labeled as text, the system matches each perimeter pixel of the thresholded component with the closest corresponding maximal gradient point. In other words, there should be a maximal gradient point in the gradient image at a pixel that corresponds to a pixel of the component of the mask within distance one. The system tries to find a match in both directions—mask to gradient and gradient to mask. If at least a certain percentage, e.g., 95%, of the component's pixels find a match in each direction, then there is a sufficient match to keep the mask.

Stated otherwise, determine Pmin, the rank bi-directional Hausdorff, distance 1 metric as the minimum of i). the percent P1 of perimeter pixels that find corresponding gradient pixels within an image distance of 1 (Euclidean metric), and ii). the percent P2 of gradient pixels that find corresponding perimeter pixels within an image distance of 1. If Pmin is greater than some threshold value Pthresh, then label the component as having regular polarity. It may occur that in one direction the match is below the threshold, e.g., 95% and in the other direction it is above the threshold. This is not good enough. We need both directions to be above the threshold percentage. If they are both above the threshold, then the system labels the image as regular; not an inverse video image.

Otherwise, the system inverts all the pixels in the bounding box of the thresholded component, i.e., ON switched to OFF and OFF switched to ON. And repeat the above step of computing Pmin. If the recomputed Pmin is greater than Pthresh, re-label this component as having reverse polarity and invert the mask component.

Otherwise, label the component as non-textual and remove it from the mask.

Compute the MRC Background Image
    Compute dilation of the mask image.
    Remove all the pixels from the original images that are part of the dilated mask.
    Fill in the removed pixels with the average color of the surrounding non-removed pixels.
    Reduce foreground image by factor R.
Compute the MRC Foreground Image
    Visit all the Thresholded Components
    If component is labeled as text component, find one constant color for the component as follows:
        If component is thick, compute its constant color to be its average mean color.
        If component is thin and has a regular polarity, then compute its constant color to be average k darkest color pixels.
        If component is thin and has a reverse polarity, then compute its constant color to be average k lightest color pixels.
    Visit all the Thresholded Components
    If component is a text component, paint the component on the foreground image using its computed constant color.
    If component is a line-art component, paint the component on the foreground image using its original color.
    Reduce the foreground image by a factor R.
    Mark all the pixels in the reduced image that have no painted pixels in its corresponding block in the high resolution foreground image as unpainted pixels.
    Fill in the unpainted pixels in the reduced foreground image by using the average color of the surrounding painted pixels.
Background Segmentation Method:
Find the dominant background region in the image
    Find the smallest square S of length 2^k, where k is an integer, that contains the whole image.
    Using Quad tree subdivision approach, recursively subdivide Square S into four quadrants.
        If size of the subdivided quadrant Sq is k2(=2)
            Compute variance of the square Sq
            If variance of the square is less than threshold T2
                Allocate a new region R, with size and location of Sq.
                Update region R with mean color and variance of Sq.
                Add R to the region list L
                Return from the recursive call and return the region list L
    If all the pixels in a square fall outside the image, it does not return a region list.
    Merge all the regions in the (up to four) lists returned by quadrants into a new list, and then examine that new list L. If any two regions, R1 and R2, have similar means and their combined variance is less than threshold T3, then we combine R1 and R2 into a new region R3, and we update region R3's mean, variance and size. We then remove R1 and R2 from list L, and add R3 to the list, where it is treated the same as any other region.

Return list L

Find the largest region in the List L at the top level and mark it as background region B.

If B has less than a certain percentage P of pixels in the image, where P is commonly 50%, the system and method stops the background segmentation method and attempts the edge detection method.

Compute mean color of the background Bmean.

Create approximate MRC mask image by turning ON (turning to black) all the pixels that are not part of the background B.

Form connected components on the approximate Mask image, and label them as "approximate components".

Classify the approximate components as text, line art, picture or noise by examining the component features, including size, area, height, width, stroke thickness, density, Euler number, etc.

Compute the final MRC mask image as follows

Visit all the approximate components

If component is classified as a text component

Compute approximate foreground mean color Finean as an average of all the pixels in the original image that correspond to the pixels of this component.

Compute the final component in the new mask as follows:

Visit all the pixels P in the original image that correspond to this component.

If P is closer to Finean than Bmean then we turn it ON in the final Mask image, otherwise we turn it OFF.

If component is classified as a line art component

Divide the component's bounding box into k×k cells

If a given k×k cell has any ON pixels in the approximate mask image that belong to this component Threshold the cell and update the final mask image using the thresholding procedure described for text components.

If component is classified as a noise component

Do not paint it in the final mask image

If component is classified as a picture component

Do not paint it in the final mask image

Add it to the picture list Plist.

If Background B has a variance below a certain threshold

Do no compute background image; replace it with the constant color Bmean.

Otherwise, compute the MRC background image

Compute dilation of the final mask image.

Remove all the pixels from the original image that are part of the dilated mask.

Remove all the pixels from the original image that are part of the picture regions stored in Plist.

Fill in the removed pixels with the average color of the surrounding non-removed pixels.

Reduce foreground image by factor R (commonly 4 or 8).

Compute the MRC foreground image

Foreground is computed using similar procedure as described in the Edge Segmentation Method.

Example embodiments of the present invention are directed to a processor implemented via any suitably appropriate hardware, programmed with software to perform the various methods described above or portions thereof.

Example embodiments of the present invention are directed to a computer-readable hardware implemented medium having stored thereon instructions adapted to be executed by a processor to perform the various methods described above or portions thereof.

Example embodiments of the present invention are directed to a method of transmitting data including instructions executable by a processor to perform the various methods described above or portions thereof.

What is claimed is:

1. A computer-implemented method of generating a mask layer of an image, comprising:

performing the following steps by a processor:

forming gradient components;

using grayscale values of pixels adjacent to maximal gradient points within the gradient components to obtain respective threshold values for the gradient components;

for each of the gradient components, using a respective one of said threshold values to threshold all pixels within a bounding box of the respective gradient component to form a respective thresholded component; and adding one or more of the thresholded components or an inverse of the one or more of the thresholded components to the mask layer.

2. The method of claim 1, wherein the forming of the gradient components includes, for each of a plurality of k by k cells, at least one of:

dividing the cell into quadrants, dividing the cell into vertical strips, and dividing the cell into horizontal strips; and for each of at least two of: (a) the cell as a whole; (b) each quadrant; (c) each vertical strip, and (d) each horizontal strip, calculating a respective mean color value and a respective variance value, wherein the maximal gradient points conditional upon that the calculated mean and variance values are not within a predetermined range of each other.

3. A computer-implemented method of generating a mask layer of an image, comprising:

performing the following steps by a processor:

(a) identifying in the image a dominant background color region;

(b) labeling the identified region's color as a background color;

(c) forming approximate connected components by merging pixels that are not in the identified dominant background color region; and (d) for each approximate connected component:

finding the connected component's color;

labeling the connected component's color as a foreground color;

traversing the connected component's pixels;

comparing each traversed pixel's color to the foreground and background colors; and placing those of the compared pixels which are closer in value to the foreground color than to the background color into the mask layer.

4. The method of claim 3, wherein the dominant background color region is identified by finding, of a plurality of color regions of the image that each corresponds to a respective area of the image, a color region having a greatest of the respective areas.

5. The method of claim 4, wherein a list of the color regions of the image is obtained using a quadtree structure.

6. The method of claim 5, wherein:

a length of sides of a top level of the quadtree structure is $2^k$;

k is an integer; and $2^k$ is a smallest length, measured as a power of 2, of a square that encloses the original image.

7. The method of claim 5, wherein the quadtree is recursively subdivided into four equal quadrants as long as a size of a lowest level of the quadtree is greater than a predetermined level size.

8. The method of claim 7, wherein the predetermined level size is 2.

9. The method of claim 7, further comprising:
where a quadrant is of the predetermined level size:
computing a new region defined by a set of pixel positions, an average color of pixels in the set of pixel positions, and a variance across values of the pixels in the set of pixel positions; and
returning the new region to a parent of the quadrant conditional upon that the variance of the new region is less that a predetermined threshold.

10. The method of claim 9, further comprising:
where a quadrant is greater than the predetermined level size:
generating a list of regions from the quadrant's sub-quadrants;
modifying the list by merging together any two of the obtained sub-quadrant regions if both (a) a difference in a respective mean color of the two obtained sub-quadrant regions is less than a threshold value and (b) a combined variance of the two obtained sub-quadrant regions is less than a predetermined threshold; and
returning the modified list to a parent of the quadrant.

11. The method of claim 7, further comprising:
where a quadrant is of length 32:
determining variances of subsections of the quadrant;
determining means of the subsections of the quadrant;
determining whether the variances of the subsections are within a predetermined first range of each other;
determining whether the means of the subsections are within a predetermined second range of each other; and
passing up the quadrant as a part of the background color region to a parent of the quadrant if the variances and means are determined to be within the predetermined ranges.

12. The method of claim 3, wherein pixels of approximate connected components that are labeled as noise based on at least one of their area, their height, their width, their stroke thickness, and their Euler number, are omitted from the mask layer regardless of the values of the pixels.

13. The method of claim 3, wherein, if, of the approximate connected components, an approximate connected component is labeled as line art based on its area, height, width, stroke thickness, and Euler number, the approximate connected component is divided into k by k cells, each cell being treated as a separate approximate connected component.

14. The method of claim 3, wherein the merging is performed by connecting pixels.

15. The method of claim 3, further comprising:
determining whether a size of the identified dominant background color region exceeds a threshold percentage of the size of the image, wherein steps (b)-(d) are performed conditional upon a positive result of the determination.

16. The method of claim 3, further comprising:
determining whether a percentage of intensity values of the image are within a fixed range, wherein steps (a)-(d) are performed conditional upon a positive result of the determination.

17. A hardware computer-readable medium having stored thereon instructions, the instructions which, when executed, cause a processor to perform a method of generating mask layer of an image, the method comprising:
forming gradient components;
for each of the gradient components:
determining at least one respective threshold value; and
applying the at least one respective threshold value to threshold a portion of an original image that corresponds to the gradient component to form a respective thresholded component; and
adding one or more of the thresholded components or an inverse of the one or more of the thresholded components to the mask layer.

18. A computer-implemented method of generating a mask layer of an image, comprising:
forming, by a processor, gradient components;
for each of the gradient components:
determining, by the processor, at least one respective intensity threshold value; and
applying, by the processor, the at least one respective intensity threshold value to threshold a portion of an original image that corresponds to the gradient component to form a respective thresholded component; and
adding, by the processor, one or more of the thresholded components or an inverse of the one or more of the thresholded components to the mask layer.

19. The method of claim 18, wherein the gradient components are formed by:
selectively computing a set of maximal gradient points;
selectively removing certain maximal gradient points;
grouping remaining maximal gradient points into gradient components; and
merging selected gradient components together.

20. The method of claim 19, wherein the gradient components are removed if they are labeled as noise based on their area, height, width, stroke thickness, and Euler number.

21. The method of claim 19, wherein the gradient components are divided into k by k cells, each of which is treated as a separate gradient component if the gradient components are labeled as line art based on their area, height, width, stroke thickness, and Euler number.

22. The method of claim 19, wherein the maximal gradient points are only calculated if found in a k by k cell with a grayscale variance above a certain threshold.

23. The method of claim 19, wherein the original image is smoothed and maximal gradient points of a gradient component corresponding to a k by k cell are subsequently recomputed when said cell contains a weighting of endpoints, singletons, k-junctions and gradient points which is above a certain threshold.

24. The method of claim 19, wherein maximal gradient points corresponding to a k by k cell of the original image which are closer to a first weakest peak in a histogram of the maximum gradient points within said k by k cell than to a second weakest peak in said histogram are removed, the first weakest peak being weaker than the second weakest peak.

25. The method of claim 19, wherein the groups of remaining maximal gradient points are connected to form corresponding gradient components.

26. The method of claim 19, wherein any two or more gradient components that overlap by more than a threshold are merged into a new gradient component.

27. The method of claim 18, wherein forming gradient components further includes at least one of: merging gradient components that form a word into a new gradient component, merging gradient components that form a line into a new gradient component, and merging gradient components that form a region into a new gradient component.

28. The method of claim 18, wherein, for each of the thresholded components, the thresholded component is added to the mask layer if it matches its corresponding gradient component.

29. The method of claim 28, further comprising:
for a thresholded component that does not match its corresponding gradient component:
inverting the thresholded component; and
determining whether the inverted component matches its corresponding gradient component;
wherein, if a match is found for the inverted component, the inverted component is added to the mask layer.

30. The method of claim 29, wherein matching criteria for the match is based on a bidirectional Rank Hausdorff between a perimeter of the thresholded component and the gradient component.

31. The method of claim 28, wherein matching criteria for the match is based on a bidirectional Rank Hausdorff between a perimeter of the thresholded component and the gradient component.

32. The method of claim 18, wherein the threshold value is determined by creating a light array and a dark array and finding a value which maximizes a sum of a number of dark array pixels below said value plus a number of light array pixels equal to or above said value.

33. The method of claim 32, where said arrays are formed by:
traversing the maximal gradient points in the gradient component and identifying a lighter side and a darker side based on values of immediately adjacent neighbors of the corresponding pixel in grayscale space; and
for each traversed maximal gradient point, placing a pixel of the lighter side into the light array and placing a pixel of the darker side into the dark array.

34. The method of claim 33, wherein at least one of:
of grayscale values of two pixels on the lighter side, the two pixels including a first pixel immediately adjacent to the maximal gradient point and the second pixel following the first pixel in a direction parallel to a gradient direction away from the maximal gradient point, a lighter of the two grayscale values is placed into the light array; and
of grayscale values of two pixels on the darker side, the two pixels including a first pixel immediately adjacent to the maximal gradient point and the second pixel following the first pixel in a direction parallel to a gradient direction away from the maximal gradient point, a darker of the two grayscale values is placed into the dark array.

35. The method of claim 18, further comprising:
for each of the gradient components:
determining a respective bounding box in which the gradient component is positioned; and
determining the portion of the original image to which the respective threshold value is to be applied based on the bounding box;
wherein:
the portion of the original image includes at least a subset of pixels within a bounding box in the original image that corresponds to the bounding box determined for the respective gradient component; and
the determination of the at least one respective threshold value includes using values of pixels within the original image that are in close proximity to pixels that correspond to gradient points within the gradient components.

36. The method of claim 35, wherein the subset includes all of the pixels within the bounding box in the original image.

37. The method of claim 35, wherein the bounding boxes corresponding to one of the gradient components is larger than a perimeter of the gradient component in at least one direction.

38. The method of claim 18, wherein the values used to obtain the respective threshold values are grayscale values.

* * * * *